United States Patent [19]

Stanford et al.

[11] Patent Number: 5,784,685
[45] Date of Patent: Jul. 21, 1998

[54] WIRELESS INTERCOM COMMUNICATION SYSTEM AND METHOD OF USING SAME

[75] Inventors: Thomas H. Stanford, Escondido; David W. Snyder, Santee; Elden R. Davisson, Poway, all of Calif.

[73] Assignee: H.M. Electronics, Inc., San Diego, Calif.

[21] Appl. No.: 515,567

[22] Filed: Aug. 16, 1995

[51] Int. Cl.[6] ............................... H04Q 7/08; H04Q 7/10
[52] U.S. Cl. .................. 455/31.2; 455/31.3; 455/422
[58] Field of Search ..................... 379/57, 58, 59; 455/38.2, 31.1, 54.1, 403, 31.2, 31.3, 426, 430, 550, 554, 555, 560, 561, 450, 464, 465; 340/825.44

[56] References Cited

U.S. PATENT DOCUMENTS

| | | |
|---|---|---|
| 3,906,166 | 9/1975 | Cooper et al. .................. 379/59 |
| 5,448,620 | 9/1995 | Gershkovich et al. ............ 379/58 |
| 5,588,037 | 12/1996 | Fuller et al. .................... 379/57 |
| 5,592,154 | 1/1997 | Lin et al. ....................... 379/57 |

*Primary Examiner*—Dwayne Bost
*Assistant Examiner*—Keith Ferguson
*Attorney, Agent, or Firm*—Bernard L. Kleinke; Peter P. Scott

[57] ABSTRACT

A base station for interconnecting via a wireless full duplex communication path, a plurality of stationary intercom unit stations with at least one portable transceiver unit. A page channel interface arrangement coupled to the stationary units and the base station interconnects the stationary units and the portable units with a common paging arrangement to enable all the users of the system to be alerted about messages to be transmitted.

8 Claims, 2 Drawing Sheets

WIRELESS INTERCOM COMMUNICATION SYSTEM AND METHOD OF USING SAME

DESCRIPTION

1. Technical Field

The present invention relates in general to an intercom communication system and more particularly, the present invention is related to a wireless communication system adapted to be utilized with a conventional wired intercom system.

2. Background Art

There have been many different types and kinds of intercom/paging systems for permitting full duplex messages to be transmitted and received. Such full duplex systems enable users to talk simultaneously in the same manner as when using conventional telephone units. Such intercom systems have utilized both hard-wired arrangements and wireless arrangements. In all prior known intercom systems, however, users have been required to utilize stationary intercom units disposed within a predetermined paging area. More particularly, it has been necessary for users to hear paging messages in order to determine which one of a plurality of communication lines a calling party has designated for a communication path.

For example, if party A desires to communicate with party B, party A utilizes a common paging arrangement to announce over a loudspeaker system for party B to pick up intercom line No. 1. Once party B picks up intercom line No. 1, party A and party B can communicate on line No. 1 without their conversation being broadcast over the loud speaker system.

While such prior known systems have been satisfactory for many applications, they have not been suitable for persons not stationed at a stationary unit. In this regard, if a person is required to move about within the predetermined paging area, such a person would need to locate an unused stationary unit in order to respond to a paging message. Locating such an unused stationary unit is time consuming, inconvenient and may not be possible if all the stationary units are in use.

One attempt at solving the above-mentioned problem has been to utilize portable wireless intercom or walkie-talkie units. While such portable wireless intercom units generally permit half duplex communications between users, they have not proven entirely satisfactory where a large number of persons must have access to the units. In this regard, such wireless units are usually tuned to the same frequency so only two persons at any given time can communicate on the same radio frequency channel.

Another problem associated with such portable wireless intercom units is their inability to generate a paging signal to alert another user that the calling party has designated a specific communication line path within a hard wired system. In this regard, such portable units do not include paging buttons nor are they capable of being connected to both a talk channel and a paging channel normally associated with hard wired intercom system.

Therefore, it would be highly desirable to have a new and improved wireless intercom communication system which enables a large group of users disposed at both stationary and portable intercom units to page one another through a common paging arrangement. Such a system should also enable both stationary and portable intercom units to transmit and receive full duplex communication messages between one another.

DISCLOSURE OF INVENTION

Therefore, the principal object of the present invention is to provide a new and improved wireless intercom communication system that enables a large group of users disposed at both stationary and portable intercom units to page one another through a common paging arrangement transmit and receive full duplex communication messages between one another.

Another object of the present invention is to provide such a new and improved wireless intercom communication system that enables a large group of users disposed at both stationary and portable intercom units to transmit and receive full duplex communication messages between one another.

Briefly, the above and further objects of the present invention are realized by providing a new and improved wireless communication system which can be utilized with a conventional wired intercom system in a very convenient manner according to a novel operation method of the present invention.

The wireless communication system includes a base station for interconnecting via a wireless full duplex communication path, a plurality of stationary intercom unit stations with at least one portable transceiver unit. A page channel interface arrangement coupled to the stationary units and the base station interconnects the stationary units and the portable units with a common paging arrangement to enable all the users of the system to be alerted about messages to be transmitted. The inventive system of the present invention thus enables, for example, a store manager wearing the portable transceiver unit to move freely about within a large retail establishment, such as a supermarket, while maintaining the ability to easily and conveniently establish a full duplex communication path with any store personnel situated at the stationary intercom unit stations, such as at the check out stations of the supermarket.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
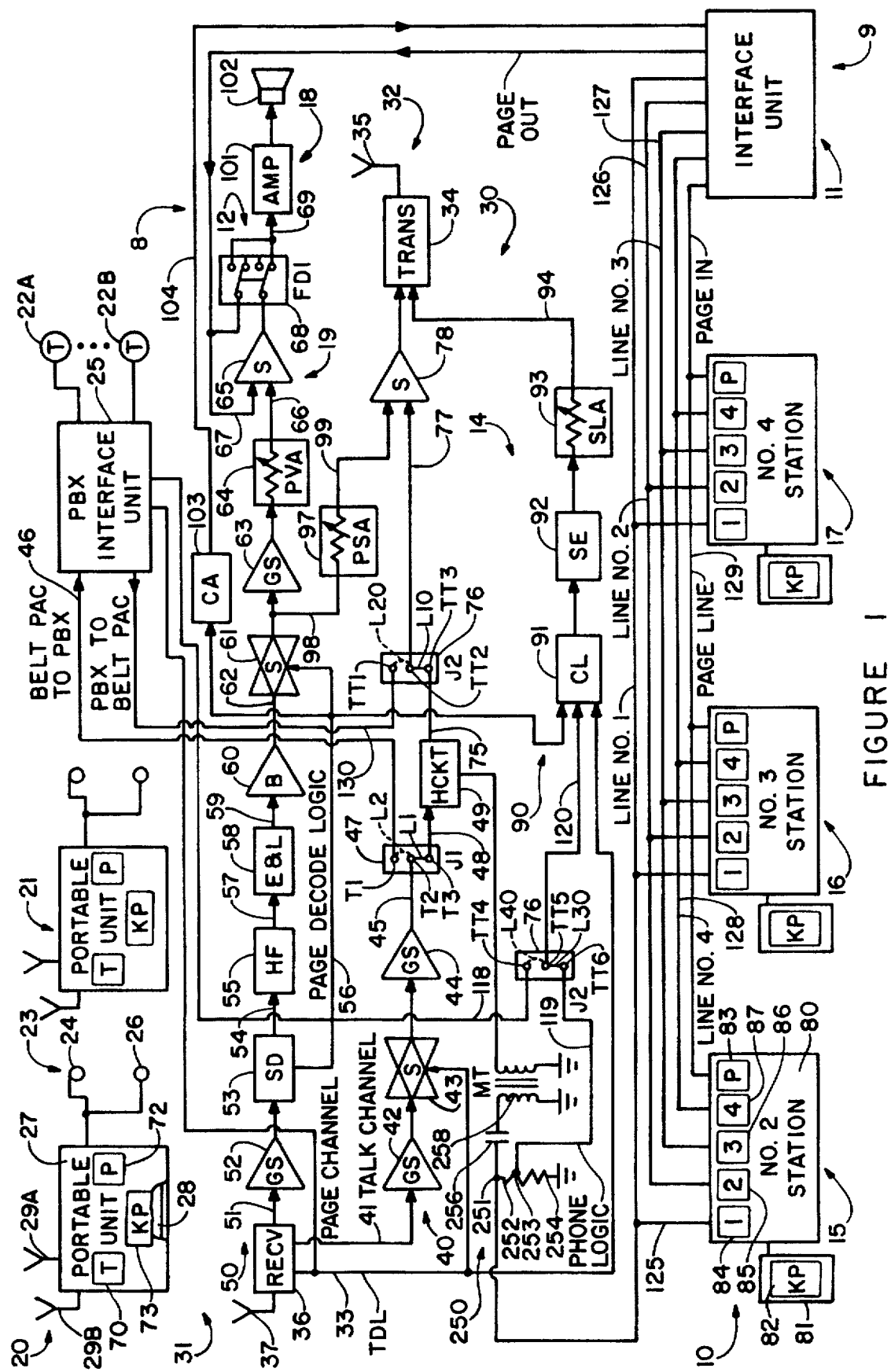
FIG. 1 is a schematic block diagram of a wireless communication system which is constructed in accordance with the present invention, and which is shown coupled between a wired intercom telephone system having a common paging arrangement.

Referring now to the drawings, and more particularly to FIG. 1 thereof, there is shown a wireless communication system 8 which is constructed in accordance with the present invention, and which is illustrated coupled between a pair of portable intercom transceiver units 20 and 21 respectively and a wired intercom telephone system 9 having group 10 of stationary intercom unit stations 15–17, a paging interface unit 11, and a common paging arrangement, indicated generally at 18. Connected in this manner, the system 8 is utilized for establishing full duplex communication paths between the stationary intercom unit stations 15–17 and the portable intercom transceiver units 20–21. In this regard, the system 8 is utilized for enabling the users of the portable units 20–21 to access the common paging arrangement 18 for alerting the other users of the system of a possible communication request. The system 8 also enables the users of the portable units 20–21 to establish full duplex communication paths with any one or all of the users of the stationary intercom telephone stations 15–17, and a half duplex communication path between the users of the portable units 20–21.

As best seen in FIG. 1, the system 8 generally includes a base station 30 for coupling messages from the portable transceiver units 20–21 to the stationary intercom units 15–17 and to the common paging arrangement 18. The system 8 also includes a page channel interface 12 that enables paging signals to be coupled to the paging arrangement 18 from the stationary intercom units 15–17 via the paging interface unit 11 and from the portable units 20 and 21 via the base station 30. The system 8 also includes a PBX interface unit 25 that enables the portable units 20 and 21 to transmit and receive full duplex messages from conventional telephone transceivers, such as transceivers 22A and 22B. As will be explained hereinafter, the base station 30 can operate in either an INTERCOM mode of operation to enable the portable units 20 and 21 to transmit and receive message relative to the intercom units 15–17 or in a PBX mode of operation to enable the portable units 20 and 21 to transmit and receive messages via the PBX interface 25. Only one mode of operation can operate at any given time.

Considering now the base station 30 in greater detail with reference to FIG. 1, the base station 30 generally includes a receiver arrangement indicated generally at 31 for receiving messages from at least one of the portable units, such as the portable unit 20 and a transmitter arrangement indicated generally at 32 for transmitting messages simultaneously to both of the portable units 20 and 21. The base station 30 also includes a talk channel interface, indicated generally at 14 for coupling full duplex audio messages between the intercom unit stations 15–17 and the portable units 20–21. The talk channel interface 14 as will be explained hereinafter, also permits half duplex messages to be coupled between the portable units 20–21.

The talk channel interface 14 generally includes a coupling transformer arrangement 250 for coupling audio signals from the base station 30 to the intercom stations 15–17 and for coupling audio signals from the intercom stations 15–17 to the base station 30.

The talk channel interface 14 further includes a hybrid communication circuit 49 that routes audio signals from the base station 30 to the arrangement 250 and that routes audio signals from the intercom stations 15–17 via the arrangement 250 to the base station 30.

As best seen in FIG. 1, the arrangement 250 is interconnected to each of the intercom station units 15–17 as well as the interface unit 11 via an audio input/output line 125. In this regard, the talk channel interface 14 enables the interface unit 11 to respond to audio and paging signals generated by portable units 20 and 21 in the same manner as though portable units 20 and 21 and the base station 30 was another intercom station unit.

The talk channel interface 14, as will be explained hereinafter in greater detail, also includes a subaudible tone line 94 coupled to the transmitter arrangement 32 to enable a subaudible tone to be encoded on all messages transmitted to the portable units 20 and 21 via the base station 30.

Considering now the portable units 20–21 in greater detail with reference to FIG. 1, each of the portable units 20 and 21 are substantially similar to one another so only the portable unit 20 will be described in greater detail.

The portable unit 20 generally includes a transceiver housing 27, a transceiver unit 28 disposed within the housing 27 and a pair of antennas 29A and 29B for sending and receiving signals mounted to the housing 27 and coupled electrically to the transceiver unit 28. The transceiver housing 27 is adapted to be worn around the waist of a user (not shown) and is secured to the user by a belt (not shown). In order to enable the user to hear the messages received by the transceiver unit 28, the portable unit 20 also includes a headset, indicated generally at 23. The headset includes an earphone 24 for enabling the user to receive audible message and a lapel or boom microphone 26 for enabling the user to transmit audible messages.

A pair of control switches mounted on the housing 27, include a push to talk control switch 70 and a page switch 72 to control the mode of operation of the portable unit 20. In this regard, the talk switch 70 and page switch 72 are coupled electrically to the transceiver unit 28 to enable the portable unit 20 to be operated in two different modes of operation, a PAGE mode of operation and a TALK mode of operation. The two modes of operation will be described hereinafter in greater detail.

In order to facilitate the TALK mode of operation, the talk switch 70 may be actuated momentarily into an actuated position. The portable unit 20 also includes a keypad 73 coupled to the transceiver 28 to enable the portable unit 20 to send touch tone communication signals via the transceiver 28 when the base station 30 is interconnected to the PBX interface unit 25.

Considering now the stationary intercom unit stations 15–17 in greater detail with reference to FIG. 1, the stations 15–17 are substantially similar so only station 15 will be described in greater detail.

As best seen in FIG. 1, the stationary intercom unit station 15 generally includes a station housing 80, a hand-held transceiver unit 81 having a keypad 82, and a set of control switches, including a page switch 83 and a set of communication line switches 84–87, respectively.

The communication line switches 84–87 enable a set of intercom lines 126–128 to be coupled to the interface unit 11. The intercom lines 126–128 are designated as line numbers 2 through 4. In this regard, each station in the system 8 has access to each of the lines 126–128.

The audio input/output line 125 coupled to the base station talk channel interface 14, as mentioned earlier, is also coupled to each of the intercom stations 15–17 as well as the interface unit 11. Connected in this manner, the base station 30 simulates a stationary intercom station and functions to complete the full duplex path between the stationary intercom stations 15–17 and one of the portable units 20–21.

From the foregoing, it should be understood by those skilled in the art, that connecting the lines 125–128 in this manner to each of the stationary stations 15–17 and the base station 30, that two or more users can access any one of the lines 125–128 for multi-party full duplex communications.

Considering now the operation of the system 8 in greater detail with reference to FIG. 1, if a user of one of the portable units, such as the portable unit 20 desires to communication with a person situated at one of the stationary intercom unit stations, such as a person at the unit station 15, the user of the portable unit 20 depresses and holds his or her page switch 72 in an actuated position. In so doing, the page communication path is established that extends from the portable unit 20, to the paging arrangement 18 via the base unit 30 and its page channel interface 12.

The user then speaks into his or her microphone 26 which causes a compressed paging message with a subaudible tone to be modulated onto a given radio frequency assigned to the portable unit 20 and transmitted to the base station 30. The receiver arrangement 31 decodes the subaudible tone and enables the paging message of the user to be coupled to the transmitter arrangement 32 to allow the user to hear the paging message he or she has transmitted. The receiver arrangement 31 also couples the paging message to the paging arrangement 18 so the paging message can be announced audibly to all of the system users. In this regard, the user initiating a call would, for example, state "station 2, pick-up line 1."

The person situated at the stationary intercom unit station 15 would then respond by actuating his or her communication line switch 84 on line 1 to speak with the user of the portable unit 20 via his or her transceiver unit 81. The user of the portable unit 20 would then release the page switch 72 and depress the talk switch 70 into an actuated position. A full duplex conversion would then take place between the user of the portable unit 20 and the persons situated at stationary intercom unit station 15 as long as the talk switch 72 is maintained in its actuated position. In this regard, full duplex operation allows both parties to talk at the same time, just as one would normally experience when utilizing a conventional telephone unit.

From the foregoing, it should be understood that a communication path from the intercom station 15 to the portable unit 20 is established via the audio input output line 125 to the base station hybrid circuit 49, thence to the transmitter arrangement 32, and thence to the portable unit 20. In a similar manner, a communication path is established from the portable unit 20 via the receiver arrangement 31, thence to the hybrid circuit 49, and thence to the intercom station 15 via the audio input outline 125 and the interface unit 11.

It should also be understood by those skilled in the art that since the communication line 125 is coupled electrically to each of the other stationary stations 16–17, the other users at stations 16–17 can join the above-mentioned conversation by actuating their respective line switches for line No. 1 communications.

As a full duplex feedback path is established for the transmitting portable unit 20, it should also be understood that the user of the other portable unit 21 will be able to receive substantially simultaneously the same transmissions received by the portable unit 20 without the need of depressing his or her talk switch. The user of the other portable unit 21, however, is not able to communicate in full duplex with the user of the portable unit 20. Instead, communication between the portable units 20–21 is in half duplex, which means only one portable unit user should depress his or her talk switch, such as the talk switch 70 at any given time. Thus, although both users of the portable units 20 and 21, respectively, may communicate in a FULL DUPLEX mode with any of the users of intercom status 15–17, only one portable unit user can have his or her talk button depressed at any given time. If more than one portable unit user activates his or her talk switch at the same time as another portable unit user, then the operation of the system 8 is unpredictable.

When a user of a portable unit, such as the portable unit 20 desires to communicate with the user of another portable unit, such as the user of portable unit 21, the user of portable unit 20 activates his or her talk switch 70 and speaks to the other user of the portable unit 21. In this regard, there is no need to initiate a paging sequence as long as the user of the other portable unit has his or her portable unit in operation because the feedback message is received by both portable units.

When the user of portable unit 20 has completed his or her message, the user of unit 20 states "over" and releases the talk switch 70 which was momentarily activated during the message transmission. The user of the other portable unit 21 then depresses momentarily his or her talk switch and communicates with the user of portable unit 20. When the user of portable unit 21 completes his or her message, the user of unit 21 states "over" and releases his or her talk switch. This process is repeated until the communication ends.

It should be understood, that if the user of the portable unit 21 did not initially respond to the message transmission communicated by the user of the portable unit 20, it would be possible for the user of the portable unit 20, to activate his or her page switch 72 to request that the user of portable unit 21 activate his or her portable unit for half duplex communication with the user of portable unit 20.

Considering now the coupling transformer arrangement 250 in greater detail with reference to FIG. 1, the arrangement 250 generally includes a pair of resistors 252 and 254 connected in a voltage divider arrangement between the audio input line 125 and ground to produce a logic control signal at a common node 253. The common node 253 is coupled to the input of the control logic 91 via a control logic line 119 to enable sub-audible tones to be encoded on all outgoing audio signal transmitted to the portable units 20 and 21 via the base station 30.

The arrangement 250 also includes a blocking capacitor 256 connected to the audio input/output line 125 at a common node 251 to block any d.c. components on the incoming audio signals from the intercom units 15–17. In order to couple signals to and from the base station 30, the arrangement 250 also includes an audio transformer 258. The transformer 258 is connected between the blocking capacitor 256 and a common audio input/output line 260 of the hybrid communication circuit 49.

Considering now the receiver arrangement 31 in greater detail with reference to FIG. 1, the receiver arrangement 31 generally includes a receiver/decoder unit 36 having an antenna 37 mounted thereto for receiving the radio frequency signals generated by the respective portable transceiver units 20 and 21. The radio frequency signals generated by the respective portable intercom transceiver units 20, 21 are tuned to the same frequency to allow either of units 20, 21 to transmit messages to the group 10 of stationary intercom unit stations 15–17 and the paging arrangement 18. As will be explained hereinafter in greater detail, the radio frequency signals generated by the respective portable transceiver units 20 and 21 are modulated with subaudible tones to help eliminate or at least greatly reduce interference with other radio frequency devices including other channels in the system.

The receiver/decoder unit 36 receives the radio frequency signals picked up by the antenna 37 and generates in response to the transmissions received from the portable units 20 or 21, one of two audio output signals. The first audio signal is a decoded talk audio signal coupled to the talk channel interface 14 via a talk channel 40 that forms part of the base station 30. A talk channel line 41 connects the decoded talk audio signal generated by receiver unit 36 to the input of the talk channel 40.

The second audio signal is a subaudible and page audio signal coupled to the page channel interface 12 via a page channel 50 that also forms part of the base station 30. A page channel line 51 connects the subaudible and page audio signal generated by the receiver/decoder unit 36 to the input of the page channel 50.

From the foregoing, it should be understood by those skilled in the art that the talk channel 40 establishes a full duplex communication path to the stationary intercom unit stations 15–17, and the page channel 50 establishes a page communication path to the paging arrangement 18 via the paging interface 12 and a page feedback communication path to the portable units 20–21 via the transmitter arrangement 32.

Considering now the subaudible and page audio signal in greater detail with reference to FIG. 1, the subaudible and page audio signal is a composite signal that includes an audio portion and a subaudible portion. The audible portion is indicative of a paging message to be broadcast to all the other users via the paging arrangement 18. The subaudible portion is a low frequency, subaudible signal that cannot be heard by the users but which is utilized by the system 8 for eliminating or at least greatly reducing interference from other wireless radios operating on the same audio frequency but having different tone levels. This last-mentioned concept of the tone detection is well known to those skilled in the wireless radio industry. In the preferred embodiment of the present invention, the transmit and receive frequencies employed by the system 8 are different.

The base unit receiver/decoder unit 36 receives and decodes messages transmitted by the portable units 20–21 and generates either a decoded talk audio signal or the subaudible and page audio signal which are, in turn, coupled to the talk channel 40 and page channel 50, respectively, for further processing. The base unit receiver/decoder unit 36 determines which signal to generate based upon the subaudible tone which is impressed on transmission message generated by the portable unit or units.

Considering now the page channel 50 in greater detail with reference to FIG. 1, the page channel 50, generally includes a gain amplifier 52 which increases the amplitude of the composite subaudible and page audio signal. A subaudible decoder 53 connected to the output of the gain amplifier 52, determines whether the subaudible tone portion of the composite signal has a proper tone modulation and also helps improve subaudible interference. In this regard, if a "good" tone is detected, the decoder 53 permits the composite signal to be coupled to a high pass filter 55 via an audio output line 54. The high pass filter 55 causes the subaudible tone portion of the composite signal to be blocked or eliminated, allowing only the audio portion of the composite signal to be passed.

The subaudible decoder 53 also includes a decode logic output line 56 which couples a page decode logic signal to an audio pass control switch 61 and to an audio control feedback arrangement indicated generally at 90. As will be explained in greater detail, the audio control switch 61 enables the audio portion of the paging signal to be coupled to the paging interface unit 12 whenever the subaudible tone is a "good" subaudible tone. In this regard, the page decode logic signal on output line 56 will change states from a logic LOW level to a logic HIGH level to enable the switch 61 to pass the page message. The feedback arrangement 90 and its function will be described hereinafter in greater detail.

The page decode logic signal on line 56 is also coupled to a chime activate circuit 103 which is coupled to the intercom interface unit 11. In this regard, when the page decode logic signal changes to a logic HIGH level, the chime activate circuit 103 generates a pulse signal to cause a chime signal to be generated by the interface unit 11. The chime signal generated by the interface unit 11 is in turn, coupled to the paging arrangement via a page out line 67 to alert the users of the system 8 that a paging message will follow.

As mentioned earlier, the paging signal generated by the portable units 20–21 is a compressed paging message. In this regard, in order to expand the passed compressed audio signal, the page channel 50 also includes an expander limiter 58. The input to the expander limiter 58 is coupled to the output of the high pass filter 55 via a line 57. The expander limiter 58, expands the compressed audio signal transmitted by the portable unit 20, and limits the audio signal amplitude in order to maintain volume of the paging message at a substantially constant level.

A buffer unit 60 connected to the output signal from the expander limiter 58, via a line 59, helps reduce distortion in the expanded output signal by providing a constant impedance load to the expander limiter 58.

The output of the buffer unit 60 is connected via a line 62 to the control switch 61 that enables the audio output signal of the page channel 50 to be coupled to a volume control circuit 19. The control switch 61 is activated to an on position whenever the subaudible decoder 53 generates the page decoder logic signal on the output line 56.

Considering now the volume control circuit 19 in greater detail with reference to FIG. 1, the volume control circuit 19 generally includes a gain amplifier 63 coupled to the output of the control switch 61 and a page volume adjust pot 64 for controlling the volume level of the page message. The output of the volume control circuit 19 is coupled to the page interface channel 12 via a page message output line 66.

Considering now the page interface channel 12 in greater detail with reference to FIG. 1, in order to couple both the page message signals from the portable units 20–21 and the page message signals from the stationary intercom units 15–17 to the paging arrangement 18, the page interface channel 12 includes a summer 65 interconnected to the paging arrangement 18 via a communication base relay 68. The input to the summer 65 is coupled to both the page message output line 66 of the volume control circuit 19 and to a page out terminal of the page interface unit 11. The output from the summer 65 and the page out terminal of the page interface unit 11 are both connected to the relay 68. In this regard, when the base unit 30 is powered up, the relay 68 is actuated to a normally closed position as illustrated in FIG. 1. In this position, the relay 68 couples the output of the summer 65 to the input of the paging arrangement 18.

When the base unit 30 is not activated, the relay 68 is switched to a normally opened position. In the normally opened position, the page out line 67 from the page interface unit 11 is coupled directly to the paging arrangement 18 as opposed to the paging arrangement 18 via the summer 65. The arrangement is to avoid the base unit summer 65 acting as an attenuator when power is not applied to the base unit 30. Thus, if the portable units 20 and 21 are not being utilized, the hand wired intercom system 9 will function in a normal manner.

Considering now talk channel 40 in greater detail with reference to FIG. 1, whenever the user of a portable unit, such as the portable unit 20, activates the talk switch 70, the receiver 36 receives a different subaudible tone than the subaudible tone transmitted with page signal. In this regard, the receiver 36 decodes the composite signal as a decoded talk audio signal, removes the subaudible tone and generates two output signals on output lines 33 and 41, respectively. Output line 41 carries the decoded talk audio signal for transmission to another user, while outline 33 carries a talk decoder logic signal that enables the message signal to be transmitted to another user only when the detected subaudible tone has the correct tone.

The talk channel 40 generally includes a first stage amplifier 42 and second stage amplifier 44 which are coupled together in series via a control switch 43. The control switch 43 couples the output of the first stage amplifier 42 to the output of the second stage amplifier 44 only when the correct subaudible tone has been detected by the receiver 36. In this regard, the talk decode logic signal must be at a logic HIGH level to enable the audio message portion of the transmission signal to be passed to the second stage amplifier 44.

The output of the second stage gain amplifier 44 is coupled to a jumper jack terminal board 47 via an output line 45. The jumper board 47 includes a set of terminals T1–T3. Terminal T1 is connected to the PBX unit 25 via a Belt-pac to PBX line 46, terminal T2 is connected to the output of the second stage amplifier 44 via the audio output line 45 and terminal T3 is connected to the input of a hybrid circuit 49 via an input line 48. As will be explained hereinafter in greater detail, the jumper board 47 facilitates coupling the audio output signal from the portable unit 20 to either the hard wired intercom system 9 or the PBX interface 25. The talk channel 40 includes another jumper jack board 76 that facilitates coupling audio signals from the hard wired intercom system 9 or audio signals from the PBX unit to the portable units 20 and 21. The jumper jack board 76 includes a set of terminals TT-1 to TT-3. Terminal TT-1 is connected to the PBX unit 25 via a PBX to Belt-pac line 130, terminal TT-2 is coupled to a summer input line 77 and terminal TT-3 is connected to the output of the hybrid circuit 49 via the output line 75.

The jumper terminal 47 and 76, respectively, enable a user to operate his or her portable unit, such as the portable unit, in an INTERCOM MODE with the wired intercom telephone system 9 or in a PBX mode with the PBX unit 25. In the INTERCOM mode of operation, a jumper L1 is connected between terminals T2 and T3 of jumper jack board 47 and a jumper L10 is connected between terminals TT2 and TT3 of jumper jack board 76. In the PBX mode of operation, jumpers L1 and L10 are removed and a jumper L2 is connected between terminals T1 and T2 and a jumper-L20 is connected between terminals TT1 and TT2 of jumper jack 76.

From the foregoing, it should be understood by those skilled in the art that in the INTERCOM mode the summer input line 77 is coupled to the output of the hybrid circuit 49, while in the PBX mode, the summer input line 77 is coupled to the PBX unit 25.

The talk channel 40 also includes a summer 78 to couple the summer input line 77 to the transmitter 34. In this regard, the summer 78 enables the user of a portable unit, such as the unit 20 to hear his or her voice messages in the selected mode of operation. The summer 78 also permits outside telephone messages to be coupled to the transmitter 34 and thence to the portable units 20–21 via an antenna 35.

Considering now the control circuit 90 in greater detail, the control circuit 90 generally includes a control logic module 91, a subaudible encoder 92 and a subaudible level adjust resistor 93. The control logic module 91 responds to the talk "decoded" logic signal, the page decode logic signal and a phone logic signal to enable the subaudible encoder 92 to generate a subaudible tone for message transmissions to the portable units 20–21. In this regard, the portable units respond only to a correct tone signal generated by the base unit 30.

The control logic module 91 has a common logic line 120 connected to jumper board 76 that includes a further set of terminals TT4–TT6. Terminal TT5 is a common terminal connected to the control logic module 91 via the conductor line 120.

In the INTERCOM mode of operation a jumper L30 is connected between terminal TT5 and TT6 which, in turn, is connected to a phone logic line 119. In this regard, the phone logic line 119 carries a direct current (DC) phone logic signal that carries the AC audio signals from the intercom stations 15–17. The phone logic signal is a LOGIC HIGH whenever an audio message is being transmitted between one or more of the stations 15–17 and one or more of the portable units 20 and 21.

In the PBX mode of operation, the phone logic line 119 is not utilized. In this regard, the jumper L30 between terminals TT5 and TT6 is removed and a jumper L4 is connected between terminals TT4 and TT5 where terminal TT4 is connected to a PBX logic line 118. The PBX logic line 118 carries a PBX logic signal generated by the PBX interface unit 25 whenever an audio message is transmitted.

From the foregoing, it should be understood that the control logic module 91 will generate a LOGIC HIGH signal whenever the intercom station 15–17 or the telephone units 22A–22B produce audio messages.

The output of the control logic module 91 is connected to the input of the subaudible encoder 92 to enable the subaudible tone to be encoded on the signal being transmitted to the portable units 20 and 21 as will be explained hereinafter.

As best seen in FIG. 1, the subaudible encoder 92 is coupled to the transmitter 34 via an output line 94 from the subaudible level adjust resistor 93. The subaudible level adjust 93 allows the user to adjust the volume level of the subaudible tone so that it will not be heard by the user.

From the foregoing, it should be understood by those skilled in the art that the transceiver 28 in the portable unit 20 will only respond to the correct tone frequency generated by the base unit 30 to allow full duplex communications.

As best seen in FIG. 1, the base unit 30 also includes a page side tone adjust pot 97 coupled between the page channel 50 and the talk channel 40. In this regard, the output of the control switch 61 is connected to one of the summer 78 inputs. The page side tone adjust pot 97 is coupled to the control switch 61 via a control switch output line 96 and to the summer 78 via a tone pot output line 99. The page side tone adjust pot 97 permits the user of a portable unit, such as the portable unit 20, to hear the page message transmitted from the portable unit 20. This is an important feature particularly if the user is outside of the audio range of the paging arrangement 18.

Considering now the paging arrangement 18 in greater detail with reference to FIG. 1, the paging arrangement 18 generally includes an amplifier 101 and a loud speaker 102. The amplifier is coupled to the relay 68 and enables the audio paging message signals to be sufficiently amplified for drawing the loudspeaker unit 102.

In order to facilitate alerting the personnel at the stationary stations 15–17 that a user of one of the portable units, such as the portable unit 20 desires to establish a communication path, the base unit 30 also includes the chime activate circuit 103. The chime activate circuit 103 is coupled between the interface unit 11 and the subaudible decoder 53. In this regard, when the subaudible decoder detects a "good" tone signal, the decoder generates the page decode logic signal on line 56 which, in turn, causes the chime active circuit 103 to produce an activate chime signal. The activate chime signal is then coupled via a chime activate line 104 to the interface unit 11 to cause it to produce a chime tone. The chime tone, in turn, is coupled back to the paging arrangement 18 via the page at line 67.

Figure 2:
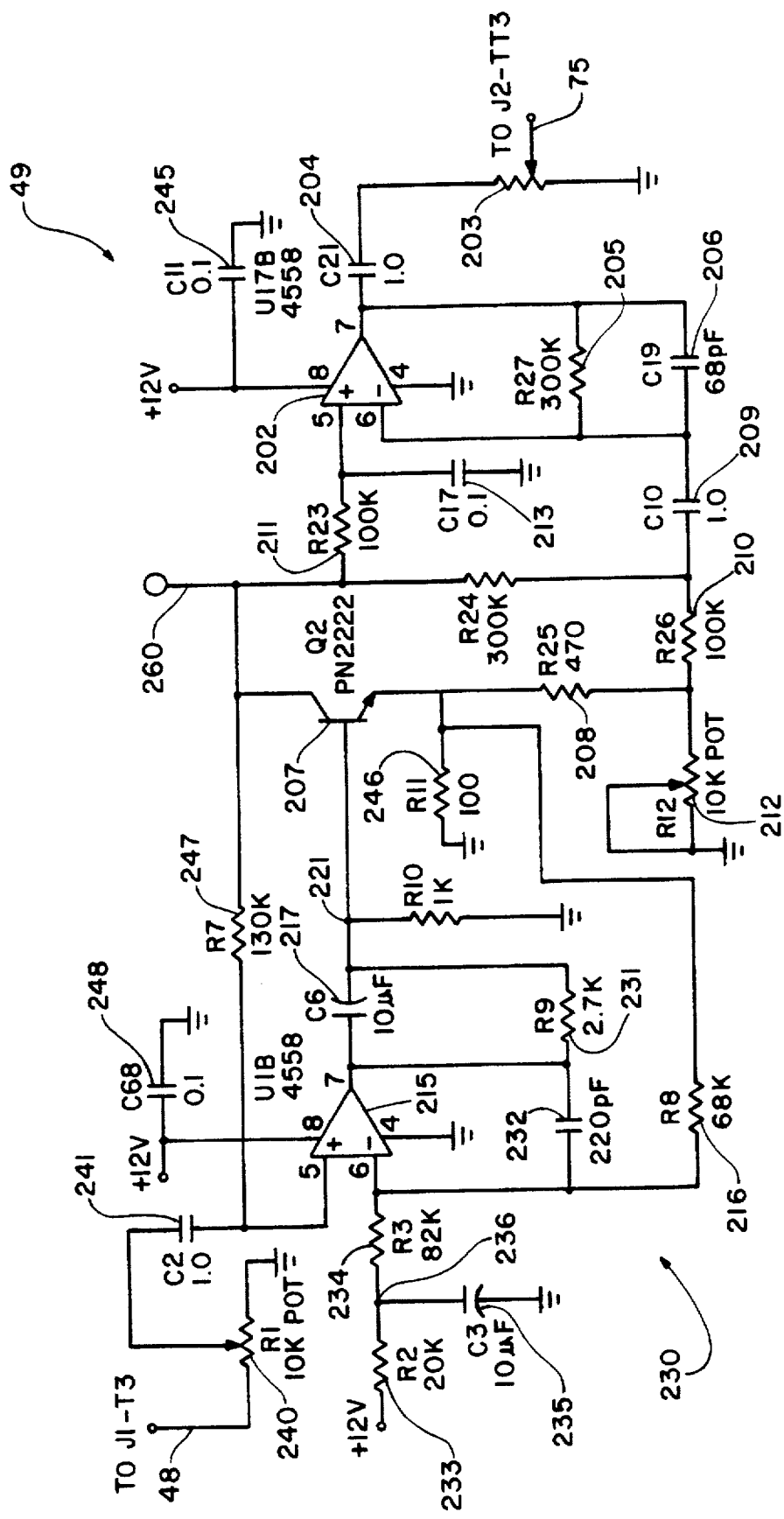
FIG. 2 is a schematic diagram of a hybrid communication circuit embodied within the communication system of FIG. 1.

Considering now the hybrid circuit 49 in greater detail with reference to FIG. 2, the hybrid circuit 49 generally comprises a buffer unit 202 and a phone to belt-pac adjustment pot 203. The phone to belt-pac adjustment pot 203 permits the audio signal level from the belt-pac to the stationary stations 15–17 to be adjusted for volume control purposes.

The buffer unit 202 is coupled to the belt-pac adjustment pot 203 via a 1.0 μfarad capacitor 204. A feedback RC circuit including a 300K ohm resistor 205 and 68 picofarad capacitor 206 is coupled between the output of the buffer unit 202 at pin 7 and the negative input of the buffer unit 202 at pin 6. The negative input of the buffer unit 202 is also connected to the emitter of a signal control transistor 207 via a pair of resistors 208 and 210 and a coupling capacitor 209. The collector of the control transistor 207 is coupled to the positive side of the buffer unit 202 via a 100K ohm resistor 211. The signal from the emitter of transistor 207 is phased reversed from the collector of transistor 207. In this regard, the user, by adjusting a side tone pot 212 can control the output of the buffer 202. The side tone pot 212 cooperates with resistor 208 to form a voltage divider for controlling the current applied to the negative input of the buffer unit 202. A 0.1 microfarad capacitor 245 is coupled between a 12V power source (not shown) and ground to filter the power supplied to the buffer unit 202 on pin 8. A similar filter capacitor 213 is coupled between the positive input pin 5 of the buffer unit 202 and ground to smooth out any transmit signals coupled from the collector of transistor 207 via the resistor 211.

The transistor 207 also functions to provide a feedback signal to an operational gain amplifier 215 via a 68K ohm feedback resistor 216. A 100 ohm current limiting resistor 246 is coupled between the emitter of transistor 207 and ground.

As best seen in FIG. 2, the output of the operational amplifier 215 is coupled to the base of transistor 207 via a 10 μfarad coupling capacitor 217. For the purpose of limiting the current supplied to base of transistor 207, a 1K ohm resistor 218, in combination with resistor 231, functions as a voltage divider and is connected between a common node 221 disposed between the base of transistor 207 and coupling capacitor 217 and ground. The operational amplifier 215 has a feedback arrangement 230 that cooperates with the feedback signal generated by transistor 207. The feedback arrangement 230 includes a 2.7 K ohm resistor 231 connected across the capacitor 217 and in series with a 220 pico farad capacitor 232 coupled to the negative input pin 6 of the operational amplifier 215.

The negative input at pin 6 of the operational amplifier 215 is further biased by a pair of series connected resistors 233 and 234 respectively, which are connected between the 12 volt power source and the negative input of the operational amplifier 215. A 10.0 μfarad capacitor 235 is coupled between ground and a common node 236 disposed between resistors 233 and 234.

A positive input pin 5 of the operational amplifier 215 is connected to the collector of the transistor 207 via a 130K ohm feedback resistor 247. The input pin 5 of the operational amplifier 215 is also connected to a belt-pac to phone adjustment pot 240 that enables the audio level signal from the belt-pac to the phone intercom to be adjusted. The belt-pac phone adjustment pot 240 is coupled to the positive input pin 5 of the operational amplifier 215 via a 1.0 μfarad capacitor 241. Power is supplied to the operational amplifier 215 from the +12V source (not shown). A 0.1 μf capacitor 248 is connected between the +12V source and ground to filter the power supplied to the amplifier 215.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. In a wired paging system having a plurality of stationary transceiver units for facilitating full duplex communication, and a paging arrangement coupled electrically to the plurality of stationary transceiver units for helping to interconnect them selectively in full duplex communication and for enabling them to perform paging operations via paging equipment, a wireless communication system, comprising:

at least one wireless portable transceiver unit for full duplex communication with at least one of the stationary transceiver units and with the paging equipment;

communication base means coupled electrically to the paging arrangement for transmitting and receiving full duplex communication messages between individual ones of the stationary transceiver units and the portable transceiver unit;

means coupling said base means to the paging arrangement for completing a talk channel for both the stationary and portable unit; and means coupling said base means to the paging equipment for completing a page channel for both the stationary and portable units so that the units can utilize the paging equipment.

2. A wireless communication system according to claim 1, wherein each one of the plurality of stationary transceiver units includes paging means for generating a paging signal to help indicate that full duplex communication is desired.

3. A wireless communication system according to claim 2, wherein said at least one portable transceiver unit includes paging signal means for generating another paging signal to help indicate that full duplex communication is desired.

4. A wireless communication system according to claim 3, further comprising:

paging indication means responsive to, said paging signal and said another paging signal for providing an indication that full duplex communication is desired.

5. A wireless communication system according to claim 4, further including interface means for enabling said portable transceiver unit to transmit and receive full duplex messages, wherein said communication base means is coupled electrically between said paging indication means and said interface means for transmitting and receiving full duplex communication messages between the plurality of stationary transceiver units and the portable transceiver unit.

6. A wireless communication system according to claim 5, further comprising at least another wireless portable transceiver unit for simultaneous half duplex communication with the first-mentioned portable transceiver unit and full duplex communication with at least one of said plurality of stationary units.

7. A wireless communication system according to claim 6, wherein said portable transceiver unit and said another portable transceiver unit each transmits and receives full duplex communication messages between individual ones of said plurality of stationary transceiver units and half duplex message between each other.

8. A method of communication, comprising:

using a plurality of stationary transceiver units disposed within a large open space room;

using a plurality of portable transceiver units worn by users free to travel within said room;

generating a paging signal to facilitate alerting users of the stationary transceiver units and the users of the portable transceiver units that communication is desired by at least one of the users;

responding to the paging signal by indicating to at least another one of the users that said one of the users desires full duplex communication; and generating simultaneously full duplex messages between users of the portable transceiver units and users of the stationary transceivers and half duplex messages between users of the portable transceiver units.

* * * * *